(12) United States Patent
Choi

(10) Patent No.: US 12,299,131 B2
(45) Date of Patent: May 13, 2025

(54) METHOD, DEVICE, AND COMPUTER READABLE MEDIUM FOR DETECTING VULNERABILITY IN SOURCE CODE

(71) Applicant: SAMSUNG ELECTRONICS CO., LTD., Suwon-si (KR)

(72) Inventor: Shinhyung Choi, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 309 days.

(21) Appl. No.: 17/661,155

(22) Filed: Apr. 28, 2022

(65) Prior Publication Data

US 2022/0253533 A1  Aug. 11, 2022

Related U.S. Application Data

(63) Continuation of application No. PCT/KR2020/014747, filed on Oct. 27, 2020.

(30) Foreign Application Priority Data

Oct. 28, 2019 (KR) .................. 10-2019-0134487

(51) Int. Cl.
 *G06F 21/57* (2013.01)
 *G06F 8/41* (2018.01)

(52) U.S. Cl.
 CPC ............ *G06F 21/577* (2013.01); *G06F 8/427* (2013.01); *G06F 2221/034* (2013.01)

(58) Field of Classification Search
 None
 See application file for complete search history.

(56) References Cited

U.S. PATENT DOCUMENTS

| | | | | |
|---|---|---|---|---|
| 7,392,545 | B1 * | 6/2008 | Weber | G06F 21/577 |
| | | | | 713/188 |
| 7,503,035 | B2 * | 3/2009 | Zeidman | G06F 40/194 |
| | | | | 434/118 |
| 7,725,735 | B2 * | 5/2010 | Fox | G06F 21/563 |
| | | | | 713/188 |
| 8,424,090 | B2 * | 4/2013 | Kang | G06F 21/563 |
| | | | | 713/188 |

(Continued)

FOREIGN PATENT DOCUMENTS

| KR | 10-2004-0096238 A | 11/2004 |
|---|---|---|
| KR | 10-1534493 B1 | 7/2015 |

(Continued)

OTHER PUBLICATIONS

Translation of the "Written Opinion of the International Searching Authority" issued Feb. 16, 2021, in connection with International Patent Application PCT/KR2020/014747, 3 pages.

(Continued)

*Primary Examiner* — Backhean Tiv

(57) ABSTRACT

Provided is a method including: obtaining source code; extracting value assignment lines by parsing the source code; detecting first lines based on keywords among the value assignment lines; detecting second lines based on credential patterns among the value assignment lines; determining third lines from among the first lines, based on the number of lines that satisfy a certain condition among the first lines; and outputting vulnerabilities in the second and third lines.

19 Claims, 12 Drawing Sheets

(56) References Cited

U.S. PATENT DOCUMENTS

| | | | |
|---|---|---|---|
| 9,104,878 B1* | 8/2015 | Khairetdinov | G06F 21/577 |
| 9,519,789 B2* | 12/2016 | Hay | G06F 21/577 |
| 9,792,443 B1* | 10/2017 | Sheridan | G06F 21/563 |
| 9,823,922 B1* | 11/2017 | Carmack | G06F 8/73 |
| 9,959,111 B2* | 5/2018 | Plate | G06F 8/65 |
| 10,089,463 B1* | 10/2018 | Katz | G06F 21/50 |
| 10,740,469 B2* | 8/2020 | Zheng | G06F 8/427 |
| 11,138,317 B2* | 10/2021 | Ramasamy | G06F 21/577 |
| 11,366,901 B2* | 6/2022 | Bishop, III | G06F 8/433 |
| 11,562,090 B2* | 1/2023 | Dodor | G06F 21/554 |
| 11,610,000 B2* | 3/2023 | Bishop, III | G06F 8/75 |
| 11,650,905 B2* | 5/2023 | Sharma | G06F 11/3604 |
| | | | 726/25 |
| 2006/0230288 A1* | 10/2006 | Fox | G06F 21/563 |
| | | | 713/188 |
| 2006/0230449 A1* | 10/2006 | Fox | G06F 21/564 |
| | | | 726/22 |
| 2009/0165135 A1* | 6/2009 | Lomont | G06F 21/566 |
| | | | 726/22 |
| 2013/0185268 A1* | 7/2013 | Kim | G06F 16/2455 |
| | | | 707/693 |
| 2016/0065613 A1* | 3/2016 | Cho | H04L 63/1416 |
| | | | 726/23 |
| 2019/0147167 A1* | 5/2019 | Kim | G06F 40/143 |
| | | | 726/25 |
| 2021/0264029 A1* | 8/2021 | Yoo | G06F 16/9024 |
| 2022/0108010 A1* | 4/2022 | Bishop, III | G06F 8/436 |
| 2022/0108022 A1* | 4/2022 | Bishop, III | G06F 8/75 |
| 2022/0253533 A1* | 8/2022 | Choi | G06F 21/6245 |
| 2023/0252161 A1* | 8/2023 | Bilgin | G06F 8/427 |
| | | | 726/22 |
| 2023/0385408 A1* | 11/2023 | Kulaga | G06F 21/563 |
| 2024/0086311 A1* | 3/2024 | Meenal Kathiresan | |
| | | | G06F 40/30 |

FOREIGN PATENT DOCUMENTS

| | | |
|---|---|---|
| KR | 10-1645019 B1 | 8/2016 |
| KR | 20180010053 A | 1/2018 |
| KR | 10-1881271 B1 | 7/2018 |
| KR | 10-2018-0106742 A | 10/2018 |
| KR | 10-1946904 B1 | 2/2019 |
| KR | 20190030490 A | 3/2019 |
| WO | 2018016671 A2 | 1/2018 |

OTHER PUBLICATIONS

International Search Report and Written Opinion of the International Searching Authority in connection with International Application No. PCT/KR2020/014747 issued Feb. 16, 2021, 8 pages.

Office Action issued Aug. 2, 2024, in connection with Korean Patent Application No. 10-2019-0134487, 10 pages.

Nightfall AI, "Introducing Radar API: Detect Credentials Secrets in Code via Machine Learning," May 14, 2019, 16 pages.

Rahaman et al., "CRYPTOGUARD: High Precision Detection of Cryptographic Vulnerabilities in Massive-sized Java Projects," Version 5, Mar. 27, 2019, 16 pages.

* cited by examiner

FIG. 12

```
"scanMode": "normal",
"fastModeFileTypes": ["properties", "tf", "tfvars", "json", "conf", "yaml", "yml", "xml", "ini", "cfg", "config", "opvn", "plist"]
"excludeFileTypes" : ["png", "ico", "bmp", "jpg", "jpeg", "avi", "mp4", "pdf", "jar", "war", "ear", "class", "rst", "vcxproj", "inf"],
"excludeFilePaths": ["target", ".git", ".idea"],
"keywords": ["token", "credential", "api", "key", "credentials", "secret"],
"dicKeywords": ["password", "pw", "pass"],
"whitelist": ["ENC\\(.*\\)", "\\$\\(.*\\)", "#\\{(.*\\)}", "\\$\\d*", "\\{\\{.+\\}\\}"],
"sourceExtentions": ["aspx", "cs", "cshtml", "ejs", "erb", "go", "html", "ipynb", "jsp", "jsx", "php", "phtml", "rb", "sh", "swift"],
"separators": ["=", ":"],
"patterns": [
{"type":"multi","name":"Amazon","clientId":"AKIA[0-9A-Z]{16}","secretKey":"[0-9a-zA-Z/+]{40}","entropy":"true"},
{"type":"single","name":"Amazon AWS Access Key ID","pattern":"AKIA[0-9A-Z]{16}","entropy":"false"},
{"type":"single","name":"Google OAuth Access Token","pattern":"ya29\\.[0-9A-Za-z\\-_]+","entropy":"true"},
{"type":"single","name":"Google API Key","pattern":"AIza[0-9A-Za-z\\-_]{35}","entropy":"true"},
{"type":"single","name":"Facebook Access Token","pattern":"EAACEdEose0cBA[0-9A-Za-z]+","entropy":"false"},
{"type":"single","name":"Picatic API Key","pattern":"sk_live_[0-9a-z]{32}","entropy":"true"},
{"type":"single","name":"Stripe Standard API Key","pattern":"sk_live_[0-9a-zA-Z]{24}","entropy":"true"},
{"type":"single","name":"Stripe Restricted API Key","pattern":"rk_live_[0-9a-zA-Z]{24}","entropy":"true"},
{"type":"single","name":"Square Access Token","pattern":"sq0atp-[0-9A-Za-z\\-_]{22}","entropy":"true"},
{"type":"single","name":"Square OAuth Secret","pattern":"sq0csp-[0-9A-Za-z\\-_]{43}","entropy":"true"},
{"type":"single","name":"Twilio API Key","pattern":"SK[0-9a-fA-F]{32}","entropy":"true"},
{"type":"single","name":"MailGun API Key","pattern":"key-[0-9a-zA-Z]{32}","entropy":"true"},
{"type":"single","name":"MailChimp API Key","pattern":"[0-9a-f]{32}-us[0-9]{1,2}","entropy":"true"},
{"type":"single","name":"PEM Certificate","pattern":"-----BEGIN\\s(?:ENCRYPTED).*PRIVATE","entropy":"false"}
]
```

METHOD, DEVICE, AND COMPUTER READABLE MEDIUM FOR DETECTING VULNERABILITY IN SOURCE CODE

CROSS-REFERENCE TO RELATED APPLICATIONS

This application is a bypass continuation of International Application No. PCT/KR2020/014747, filed Oct. 27, 2020, which claims priority to Korean Patent Application No. 10-2019-0134487 filed Oct. 28, 2019, the disclosures of which are herein incorporated by reference in their entirety.

BACKGROUND

1. Field

The present disclosure relates to detection of a vulnerability in source code, and more particularly, to detection of a vulnerability due to information hard-coded within the source code.

2. Description of Related Art

Source code is text written in a human-readable programming language, and is a component constituting a program. A computer may execute a program by reading the source code through a compiler.

Because source code contains data regarding a program structure or algorithms, leakage of the source code may adversely affect a program developer. However, in order to guarantee the reliability of a program by sharing technology with the public and to test a program in various environments by inducing participation from external developers, the number of projects aiming at developing a program using an open source method where source code is disclosed to the public is increasing.

When software is developed as open source software, text hard-coded within source code is also all disclosed, and accordingly, developers need to take care not to inadvertently leave in the source code confidential information such as authentication information required to access an application programming interface (API) or specific information. However, the larger the size of a project so the greater the number of people involved in the project, the greater the chance that confidential information is mistakenly written into the source code.

Thus, a technique for detecting vulnerabilities in source code is required.

SUMMARY

Embodiments of the present disclosure provide a technique for detecting vulnerabilities in source code.

According to an aspect of the present disclosure, a method includes: obtaining a source code; extracting value assignment lines by parsing the source code; detecting first lines based on keywords among the value assignment lines; detecting second lines based on credential patterns among the value assignment lines; determining third lines from among the first lines, based on the number of lines that satisfy a certain condition among the first lines; and outputting vulnerabilities in the second and third lines.

In the method, the source code may be obtained based on access information transmitted from a user via a web page.

The method may further include obtaining project files, wherein the source code is included in a code file among the project files.

The obtaining of the source code may include excluding a media file from the project files.

The value assignment lines may be extracted by tokenizing the source code into keys, separators, and values.

The keywords may include a first keyword and a second keyword, the first lines may include a line associated with the first keyword, and the detecting of the first lines may include excluding a line associated with the second keyword and containing a certain word.

The certain word may be registered in a dictionary.

The detecting of the first lines may include excluding a line encrypted and associated with at least one of the keywords from the value assignment lines.

The credential patterns may be different depending on service providers.

The detecting of the second lines may include excluding a line that satisfies a certain entropy condition while matching at least one of the credential patterns.

The certain condition may include a degree of similarity.

The determining of the third lines may include excluding the lines that satisfy the certain condition among the first lines based on the number of the lines.

When the number of the lines that satisfy the certain condition is greater than a certain number, the lines may be excluded.

The certain number may be 10.

The method may further include identifying file paths and file names of files including the second lines or the third lines, and the vulnerabilities in the second and third lines may be output based on the file paths and the file names.

A line containing a certain word in a file path or file name may have fewer vulnerabilities than a line that does not contain the certain word in the file path or file name.

The method may further include determining connectivity to service providers based on the second lines, and the vulnerabilities in the second lines may be output based on the connectivity.

The vulnerabilities may be provided to a user via a web page.

According to another aspect of the present disclosure, a device includes: a computer-readable medium storing instructions; and a processor configured to execute the instructions to: obtain source code; extract value assignment lines by parsing the source code; detect first lines based on keywords among the value assignment lines; detect second lines based on credential patterns among the value assignment lines; determine third lines from among the first lines, based on the number of lines that satisfy a certain condition among the first lines; and output vulnerabilities in the second and third lines.

According to another aspect of the present disclosure, a computer-readable medium stores instructions which, when executed by a processor, causes the processor to: obtain source code; extract value assignment lines by parsing the source code; detect first lines based on keywords among the value assignment lines;

detect second lines based on credential patterns among the value assignment lines; determine third lines from among the first lines, based on the number of lines that satisfy a certain condition among the first lines; and output vulnerabilities in the second and third lines.

Before undertaking the detailed description below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 12 illustrates an exemplary source code in a configuration file of a credential scanner according to an embodiment of the present disclosure.

DETAILED DESCRIPTION

Figure 1:
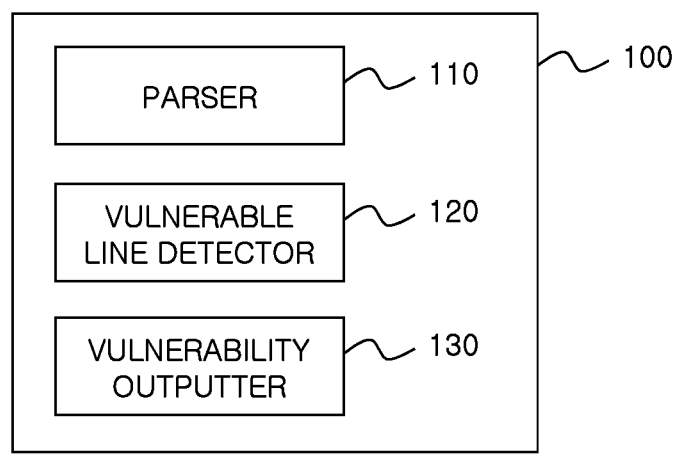
FIG. 1 illustrates a block diagram of a device according to an embodiment of the present disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Terms used in the present disclosure will now be briefly described and then the present disclosure will be described in detail.

Embodiments are described more fully hereinafter with reference to the accompanying drawings so that they may be easily implemented by one of ordinary skill in the art to which the present disclosure belongs. However, embodiments may be implemented in various forms and should not be construed as being limited to the embodiments set forth herein. Furthermore, parts not related to descriptions of the present disclosure are omitted to clearly explain the embodiments in the drawings, and like reference numerals denote like elements throughout.

As the terms used herein, general terms that are currently widely used are selected by taking functions according to various embodiments into account, but the terms may have different meanings according to the intention of one of ordinary skill in the art, precedent cases, or advent of new technologies. Furthermore, specific terms may be arbitrarily selected by the applicant, and in this case, the meaning of the selected terms will be described in detail in the detailed description of an embodiment. Thus, the terms used herein should be defined not by simple appellations thereof but based on the meaning of the terms together with the overall description of the present disclosure.

Singular expressions used herein are intended to include plural expressions as well, unless the context clearly indicates otherwise. It should be understood that the term "comprises" or "includes" is intended to specify the presence of stated features, numbers, steps, operations, elements, components, or combinations thereof and does not preclude the presence or addition of one or more other features, numbers, steps, operations, elements, components, or combinations thereof. In particular, numbers are presented as examples for assisting in understanding, and embodiments should not be understood as being limited by the numbers.

In addition, terms such as "portion," "module," etc., described in the disclosure refer to a unit for processing at least one function or operation and may be embodied as hardware or software, or a combination of hardware and software.

It will be understood that, although the terms such as "first," "second," etc. may be used herein to describe various elements, these elements should not be limited by the terms. The terms are only used to distinguish one element from another element. Thus, a "first element" mentioned below may be termed a "second element" without departing from the technical idea of an embodiment.

Expressions such as "at least one of" modify the entire list of elements and do not modify the individual elements of the list. For example, the expression "at least one of a, b, and c" indicates only a, only b, only c, both a and b, both b and c, both a and c, all of a, b, and c, or combinations thereof.

Throughout the disclosure, examples of an electronic device may include, but are not limited to, a smartphone, a tablet, a mobile phone, a personal digital assistant (PDA), a media player, a portable multimedia player (PMP), an electronic book terminal, a digital broadcasting terminal, a personal computer (PC), a laptop, a micro server, a global positioning system (GPS) device, a navigation device, a kiosk, an MP3 player, a smart TV, a digital camera, and other mobile or non-mobile computing devices.

According to an embodiment, a vulnerable line may be detected in source code, and a vulnerability for the detected vulnerable line may be output. Thus, before source code of an open source program is disclosed, an accident due to leakage of confidential information may be prevented by inspecting the source code for vulnerabilities.

In the present disclosure, a vulnerable line refers to a line of source code that includes or is determined to include confidential information such as authentication information required to access an application programming interface (API) or specific information. When the vulnerable line is disclosed together with the source code, the confidential information contained in the vulnerable line may be exploited.

In the present disclosure, a vulnerability in a line indicates that the line includes or is determined to include confidential information. A vulnerability may indicate the degree of vulnerability, and the degree of vulnerability may be determined based on the importance of confidential information included in a corresponding line, whether a line similar to the corresponding line exists, the number of similar lines, etc.

FIG. 1 illustrates a block diagram of a device according to an embodiment of the present disclosure.

Referring to FIG. 1, a device 100 according to the embodiment may include a parser 110, a vulnerable line detector 120, and a vulnerability outputter 130. Each of the parser 110, the vulnerable line detector 120, and the vulnerability outputter 130 may be implemented as a module performing a corresponding function, such as a software module, but is not limited thereto, and may be implemented as a hardware module or a combination of a hardware module and a software module.

According to embodiments, the device 100 may include more or fewer units than the units described above. Because the units of the device 100 are only individually named in order to distinctively describe operations performed by the device 100, it should not be understood that a particular operation performed by the device 100 is necessarily performed by a specific unit. For example, in the present disclosure, an operation described as being performed by a specific unit of the device 100 may be performed by another unit, an operation described as being performed by one unit of the device 100 may be performed by a plurality of units thereof, and an operation described as being performed using interactive processing between a plurality of units of the device 100 may be performed by one unit thereof. Furthermore, an operation described as being performed by the device 100 may be performed by another device or with the help of the other device.

The device 100 may include a memory and a processor. Software modules, e.g., program modules, of the device 100 may be stored in the memory as a set of instructions, and the instructions may be executed by the processor to perform corresponding functions.

Information may be parsed by the parser 110. For example, source code files input to the parser 110 may be parsed.

A vulnerable line may be detected in source code by the vulnerable line detector 120. The vulnerable line refers to a line containing confidential information such as authentication information required to access an API or specific information. The vulnerable line detector 120 may detect, in the source code, a line including text related to a password, a key, a credential, a token, etc. The vulnerable line may refer to only text that corresponds to the confidential information in the source code, or a line containing the text.

In the present disclosure, lines may include comment lines as well as lines of code. Lines may be classified into logical lines as well as physical lines. Each physical line may be separated depending on the presence of a newline, and each logical line may be separated by a command.

According to an embodiment, a vulnerable line may be detected in the source code based on a keyword or a credential pattern via the vulnerable line detector 120.

A vulnerability in the detected vulnerable line may be output via the vulnerability outputter 130. A vulnerability in a line indicates that the line includes or is determined to include confidential information. According to an embodiment, the vulnerability outputter 130 may distinguish lines that are not actually vulnerable among the detected vulnerable lines, or classify lines according to the degree of vulnerability.

A method of detecting a vulnerability in source code according to an embodiment of the present disclosure is further described with reference to FIG. 2.

Figure 2:
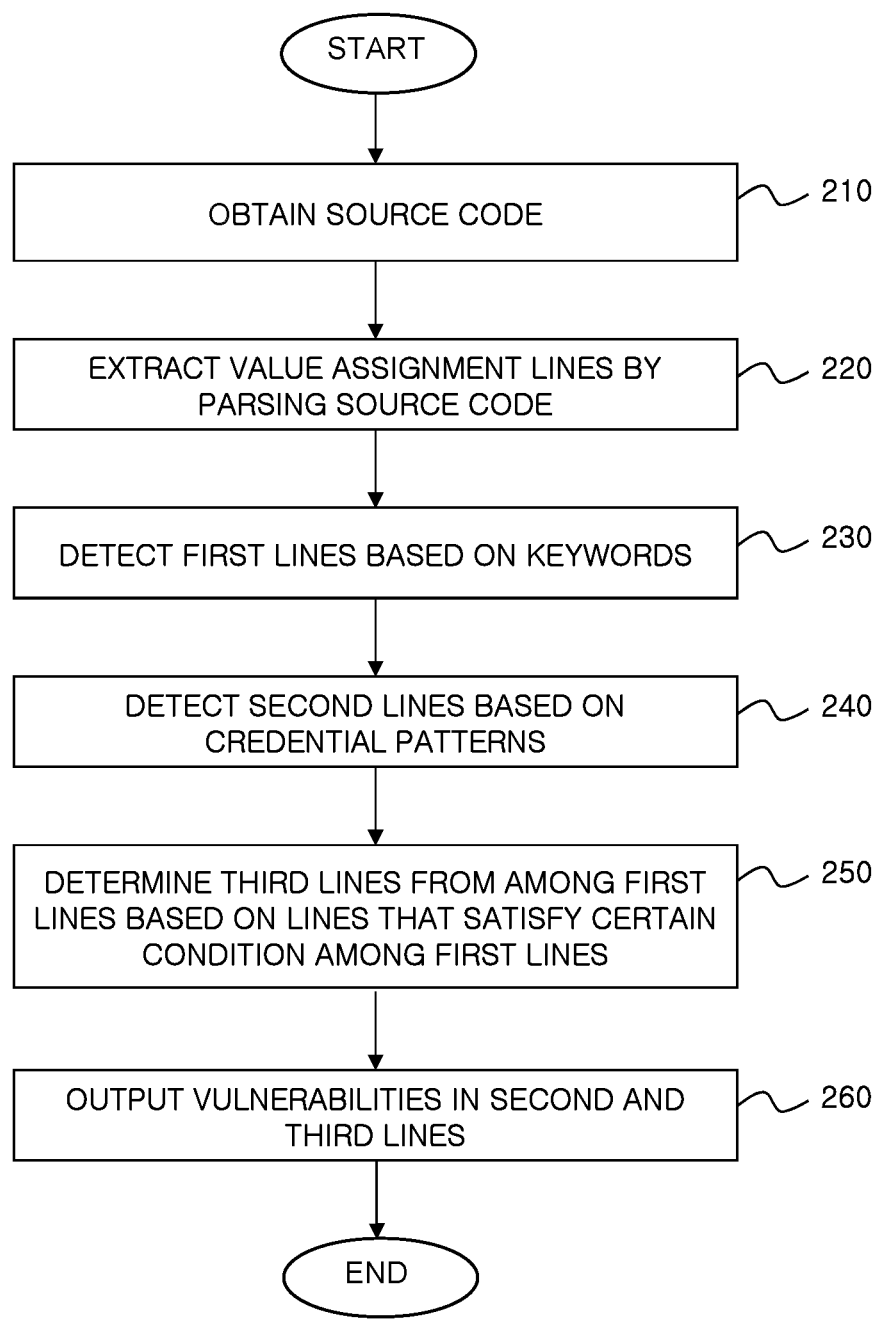
FIG. 2 illustrates a flowchart of a method according to an embodiment of the present disclosure.

FIG. 2 illustrates a flowchart of a method according to an embodiment of the present disclosure.

In operation 210, the device 100 may obtain source code. The source code may be obtained from a file via the parser 110. A plurality of source code sets may be obtained from a plurality of files. A method of obtaining source code will be described below with reference to FIG. 3.

In operation 220, the device 100 may extract value assignment lines from the source code. Value assignment lines indicate lines to which values are assigned in the source code, and may be extracted by parsing the source code via the parser 110. A method of extracting value assignment lines from the source code will be described below with reference to FIG. 3.

In operation 230, the device 100 may detect first lines among the value assignment lines. The first lines may be detected based on keywords via the vulnerable line detector 120. A method of detecting first lines will be described below with reference to FIG. 5.

In operation 240, the device 100 may detect second lines among the value assignment lines. The second lines may be detected based on credential patterns via the valuable line detector 120. A method of detecting second lines will be described below with reference to FIG. 6.

In operation 250, the device 100 may determine third lines from among the first lines. The third lines may be determined based on lines that satisfy a certain condition from among the first lines. A method of determining third lines from among first lines will be described below with reference to FIG. 8.

In operation 260, the device 100 may output vulnerabilities in the detected lines. For example, vulnerabilities in the first and second lines may be output via the vulnerability outputter 130. Vulnerabilities in the second lines and the third lines determined among the first lines may be output via the vulnerability outputter 130. A method of classifying vulnerability levels of lines will be described below with reference to FIG. 9.

In the present disclosure, a credential scanner may refer to a program that detects a vulnerable line in source code.

Moreover, according to embodiments, each of the units of the device 100, e.g., the parser 110, the vulnerable line detector 120, and the vulnerability outputter 130, may include sub-units. Each unit may include more or fewer sub-units than those described in the present disclosure. Because sub-units of each unit are only individually named in order to distinctively describe operations performed by each unit, it should not be understood that a particular operation performed by each unit is necessarily performed by a specific sub-unit. For example, in the present disclosure, an operation described as being performed by a specific sub-unit may be performed by another sub-unit, an operation described as being performed by one sub-unit may be performed by a plurality of sub-units, and an operation described as being performed using interactive processing between a plurality of sub-units may be performed by one sub-unit.

Furthermore, an operation described as being performed by a specific unit may be performed by another unit or with the help of the other unit. Each unit may be in a hierarchical relationship with its sub-units, but because sub-units of each unit are only individually named in order to distinctively describe operations performed by each unit, the unit may not be in a hierarchical relationship with its sub-units.

Operations performed by each unit of the device 100 according to an embodiment of the present disclosure will be described with reference to FIGS. 3 through 9.

Figure 3:
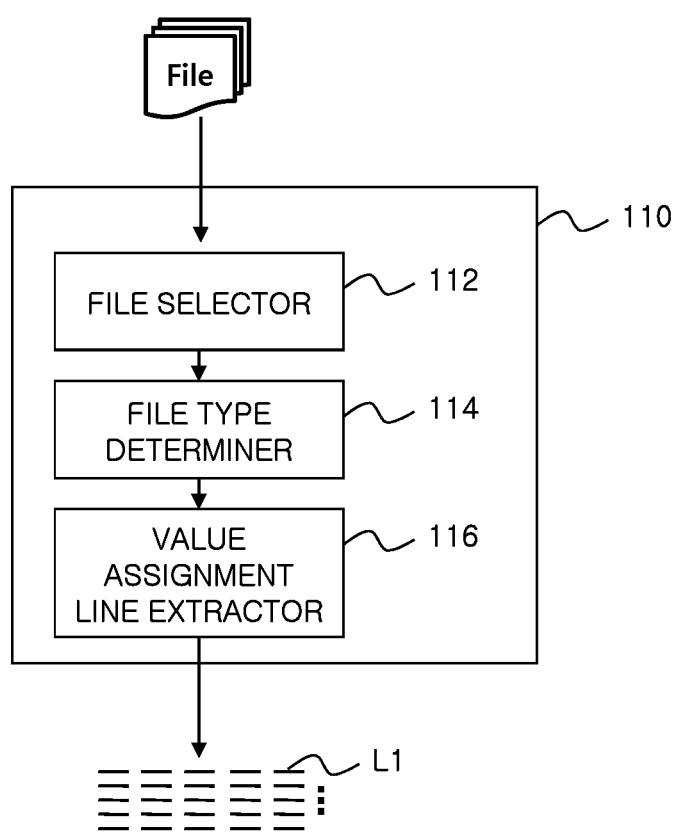
FIG. 3 illustrates a block diagram of a parser according to an embodiment of the present disclosure.

FIG. 3 illustrates a block diagram of a parser according to an embodiment of the present disclosure.

As shown in FIG. 3, the parser 110 of the device 100 may include a file selector 112, a file type determiner 114, and a value assignment line extractor 116.

The device 100 may extract value assignment lines L1 by obtaining and parsing source code files via the parser 110. Source code may be obtained from a file, and a plurality of source code sets may be obtained from a set of project files. In an embodiment, the source code may be obtained based on access information transmitted from a user via a web page. The access information may indicate a location of the project files and the device 100 may access the project files via the access information. The project files may be stored in a repository outside the device 100.

Files that are to be scanned among the project files may be selected or excluded by the file selector 112. In other words, scanning may be performed on the selected files but not on the excluded files. Thus, vulnerabilities in the project files may be efficiently detected. According to an embodiment, files that are highly unlikely to include a vulnerable line among the project files, e.g., media files, may be excluded from the scanning. In order to exclude particular files from the scanning, as written in line 3 of FIG. 12, extensions of the files to be excluded may be set in a configuration file of a credential scanner.

A file type for a file to be scanned may be determined by the file type determiner 114. The file type may be determined based on a file extension or a file signature. A file may be parsed using a different type of parser depending on a determined file type. In this case, it may be determined whether a file is parsable, and only the parsable file may be parsed.

The source code may be parsed so that value assignment lines L1 may be extracted from the source code via the value assignment line extractor 116. The value assignment lines L1 may be extracted from the source code by tokenizing the source code into keys, separators, and values. In other words, a value assignment line includes a key, a separator, and a value, and the key and the value may be separated by the separator. The separator may be an equal sign (=) or a colon (:) as specified in line 9 of FIG. 12, but is not limited thereto. The separator may be different depending on a file type for a file being parsed.

According to an embodiment of the present disclosure, a vulnerable line may be detected among the value assignment lines L1 extracted from the source code, as described with reference to FIG. 4.

Figure 4:
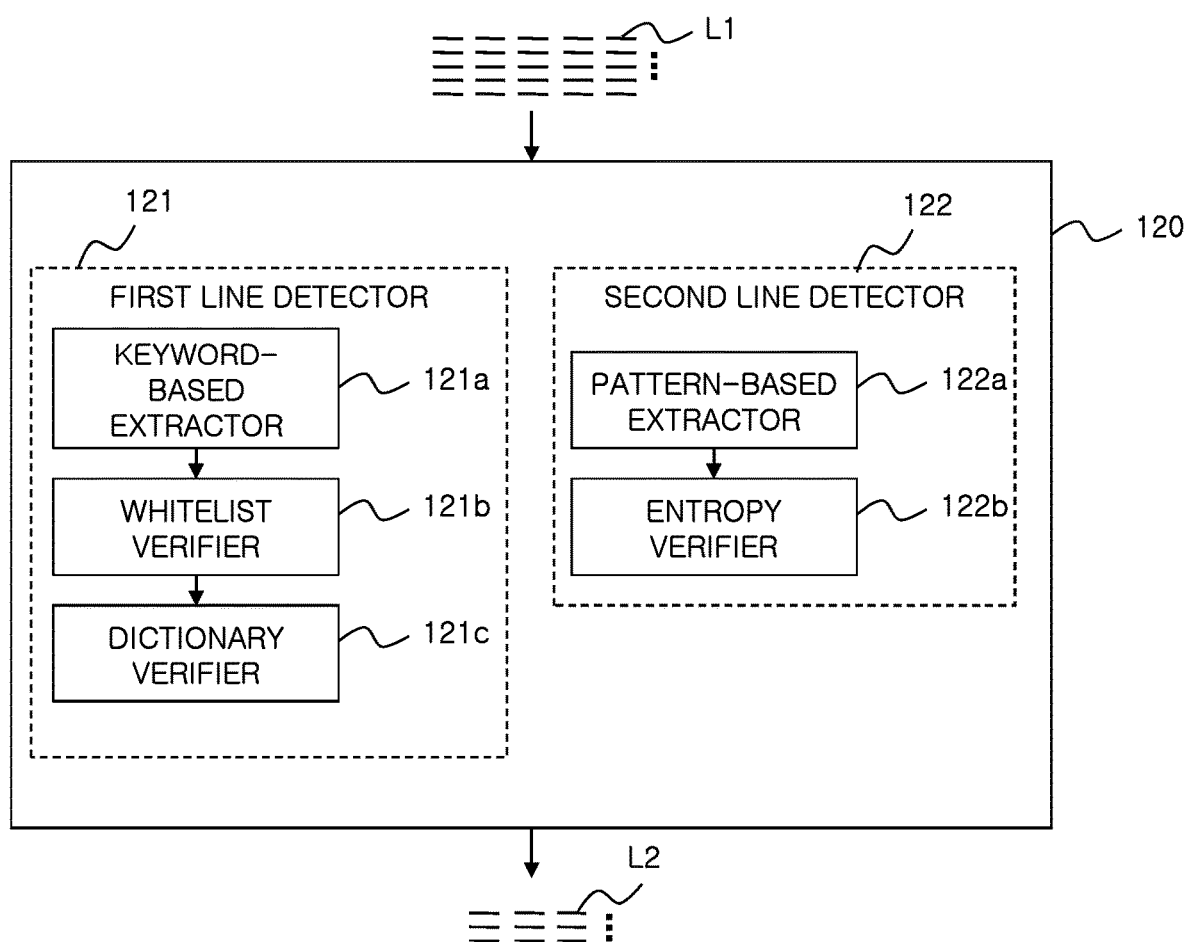
FIG. 4 illustrates a block diagram of a vulnerable line detector according to an embodiment of the present disclosure.

FIG. 4 illustrates a block diagram of a vulnerable line detector according to an embodiment of the present disclosure.

Referring to FIG. 4, the vulnerable line detector 120 of the device 100 may include a first line detector 121 and a second line detector 122.

Vulnerable lines L2 may be detected among value assignment lines L1 of source code via the vulnerable line detector 120. The vulnerable lines L2 may be detected based on keywords or patterns. In the present disclosure, a vulnerable line L2 detected based on a keyword may be referred to as a first line, and a vulnerable line L2 detected based on a pattern may be referred to as a second line.

The first line detector 121 may detect a line including a specific keyword in order to detect a vulnerable line L2 that is not standardized or difficult to standardize. The second line detector 122 may detect a line having a specific pattern in order to detect a vulnerable line L2 that is relatively standardized.

Figure 5:
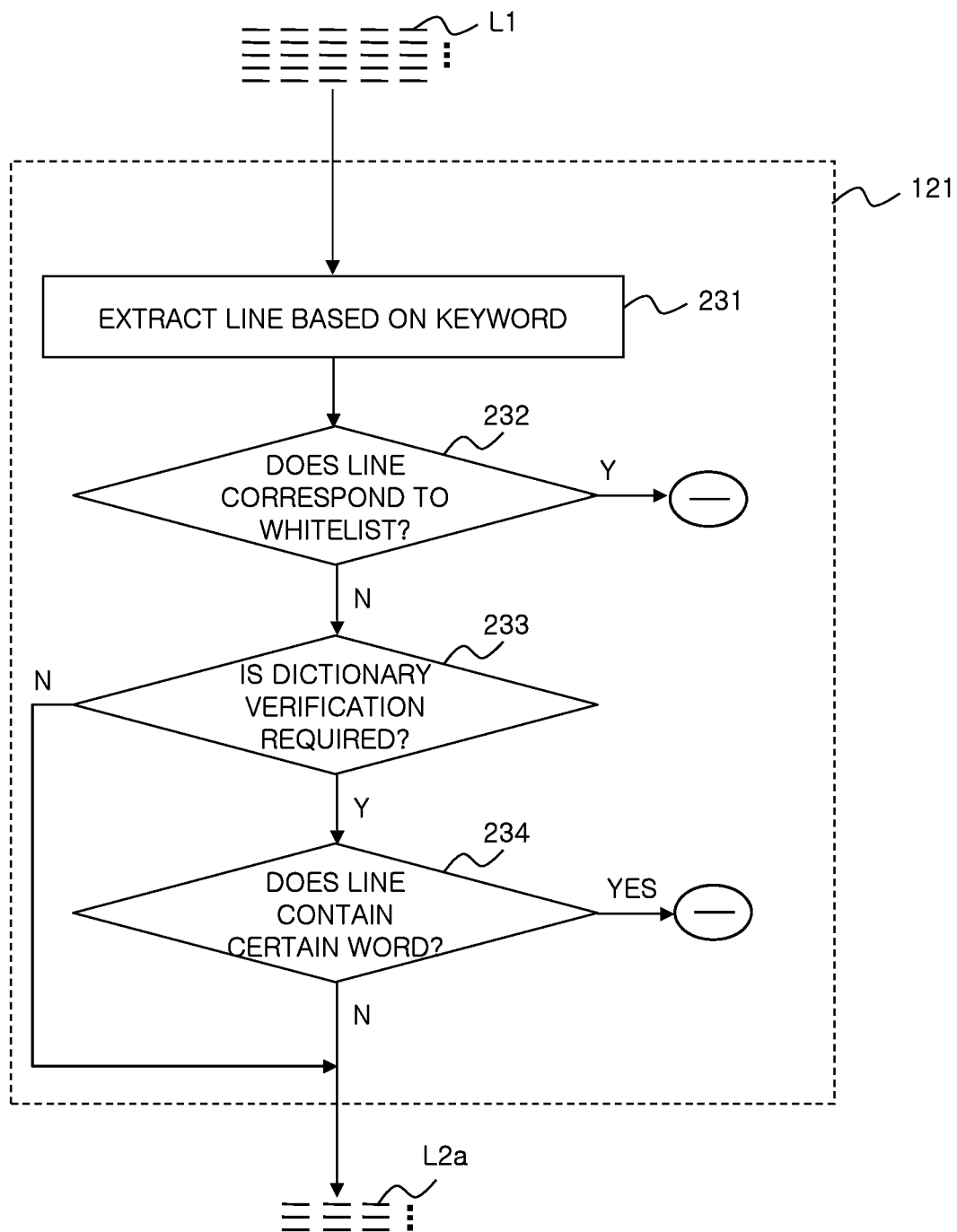
FIG. 5 illustrates a flowchart of a method of detecting a vulnerable line based on a keyword according to an embodiment of the present disclosure.

In an embodiment, the first line detector 121 may include a keyword-based extractor 121a, a whitelist verifier 121b, and a dictionary verifier 121c, and the first line detector 121 and a method, performed by the first line detector 121, of detecting a first line based on a keyword is described further with reference to FIG. 5.

FIG. 5 illustrates a flowchart of a method for detecting a vulnerable line based on a keyword according to an embodiment of the present disclosure.

In operation 231, the first line detector 121 may extract, based on a keyword, a line from value assignment lines L1 extracted from source code. The keyword may be a keyword related to a password, a key, a credential, a token, etc. For example, as specified in "keywords" at line 5 of FIG. 12, keywords may be "token," "credential," "api," "key," "credentials," and "secret" but are not limited thereto, and may further include "password," "pw," and "pass" as specified in "dicKeywords" at line 6 of FIG. 12. According to an embodiment, lines including the keywords may be extracted from the value assignment lines L1 via the keyword-based extractor 121a. To extract lines including the keywords from the value assignment lines L1, for example, the following regular expression may be used:

Regex(Key(Keywords, *dicKeywords*) + Separator( = , :) + Value).

Because a line including the keywords has a high probability of being a line related to authentication information required to access an API or specific information, i.e., a line containing confidential information, the corresponding line may be exploited as a vulnerable point of a corresponding program when the line is disclosed together with the source code containing the line it. Therefore, by detecting such a vulnerable line L2 in advance before disclosure of the source code, an accident due to leakage of confidential information may be prevented.

In operation 232, the first line detector 121 may determine whether the extracted line corresponds to a whitelist. All lines including the keywords among the value assignment lines L1 may not be the vulnerable lines L2. Therefore, by filtering out a line corresponding to the whitelist via the whitelist verifier 121b, a non-vulnerable line, that is, a line determined not to contain confidential information or to be exploited, will be excluded. For example, as specified in line 7 of FIG. 12, an encrypted line may be included in the whitelist. Whether a line is encrypted may be determined based on whether the line includes a regular expression associated with encryption. Here, the encrypted line may refer to a line entirely encrypted as well as containing encrypted confidential information. Because the encrypted line is impossible or difficult to exploit even when the encrypted line is leaked, a false positive (FP) rate of the detected vulnerable lines L2 may be reduced by excluding the encrypted line from a list of first lines.

In operation 233, the first line detector 121 may determine whether the extracted line is a line requiring dictionary verification, and perform dictionary verification on the corresponding line. According to an embodiment, the determination as to whether the extracted line corresponds to the whitelist and the dictionary verification may be performed in a reverse order or in parallel.

In operation 234, the first line detector 121 may filter out a line further containing a certain word from among extracted lines through the dictionary verification. In other words, it may be determined, through the dictionary verification, whether the extracted line further contains a word frequently used in the source code and registered in a dictionary.

All of the lines including the keywords among the value assignment lines L1 may not be the vulnerable lines L2. Therefore, by filtering out a line further containing a certain word via the dictionary verifier 121c, a non-vulnerable line, i.e., a line determined not to include confidential information or not to be exploited, may be excluded. For example, for a line including the dicKeywords, i.e., "password," "pw," and "pass," specified in line 6 of FIG. 12, the dictionary verifier 121c may determine that the corresponding line requires dictionary verification and then determine whether the line further contains a certain word, e.g., a word registered in the dictionary and frequently used in the source code. The dictionary verifier 121c may refer to k word sets most frequently used in the source code, and the word sets may be updated. The "password," "pw," and "pass" are frequently used in connection with user interfaces, and are highly likely to be used in contexts other than for confidential information. Accordingly, an FP rate of the detected vulnerable lines L2 may be reduced by excluding, via the dictionary verification, a line further containing a word registered in the dictionary and frequently used in the source code, in addition to "password," "pw," and "pass."

In the present disclosure, among the keywords, keywords that do not require dictionary verification may be referred to as first keywords, and keywords that require the dictionary verification may be referred to as second keywords. Because the first keywords described above, such as "token," "credential," "api," "key," "credentials," and "secret," and the second keywords, such as "password," "pw," and "pass," are merely examples, the first and second keywords may be variously modified.

In an embodiment, first lines L2a excluding a non-vulnerable line from the value assignment lines L1 may be detected by the first line detector 121. According to an embodiment, because lines that are highly unlikely to correspond to the vulnerable lines L2 are not detected as the first lines L2a, an FP rate of the detected vulnerable lines L2 may be reduced.

Moreover, the second line detector 122 may detect a line having a specific pattern in order to detect a vulnerable line L2 that is relatively standardized. Here, the pattern may be a pattern of credentials for accessing APIs of various service providers.

In an embodiment, the second line detector 122 may include a pattern-based extractor 122a and an entropy verifier 122b, and a method, performed by the second line detector 122, of detecting a second line based on a pattern is further described with reference to FIG. 6.

Figure 6:
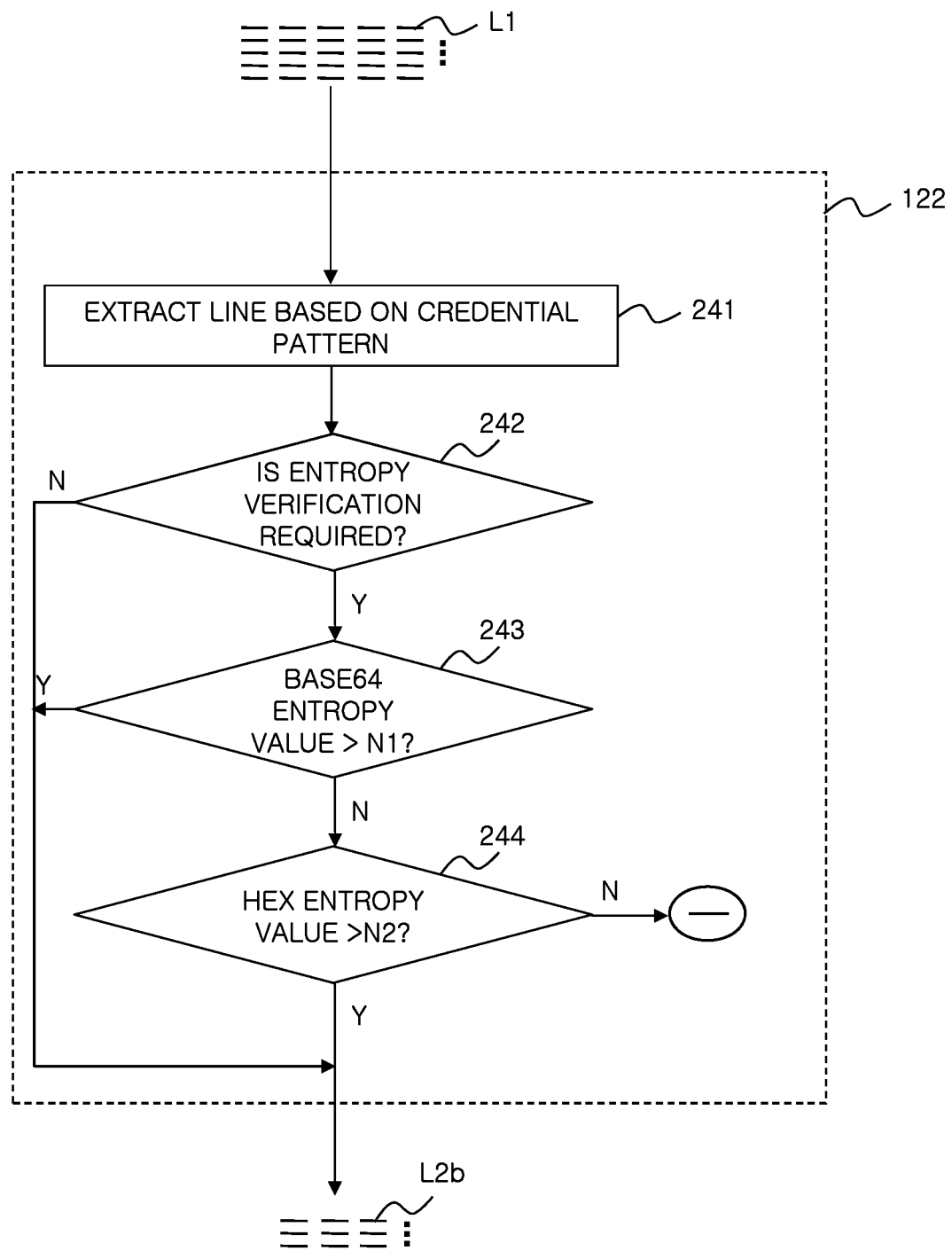
FIG. 6 illustrates a flowchart of a method of detecting a vulnerable line based on a credential pattern according to an embodiment of the present disclosure.

FIG. 6 illustrates a flowchart of a method of detecting a vulnerable line based on a credential pattern according to an embodiment of the present disclosure.

In operation 241, the second line detector 122 may extract lines from the value assignment lines L1 based on the credential pattern. Authentication credential patterns may be different depending on service providers. For example, as specified in lines 11 through 26 of FIG. 12, a different credential pattern may be defined for each service provider. According to an embodiment, a line including a portion matching the defined credential pattern may be extracted from the value assignment lines L1 via the pattern-based extractor 122a. Whether the line includes a portion matching the credential pattern may be determined based on whether the corresponding line includes a portion matching a regular expression for the credential pattern.

In operation 242, the second line detector 122 may determine whether the extracted line is a line requiring entropy verification and perform the entropy verification on the corresponding line. Whether a line requires the entropy verification may be determined depending on a type of credential pattern matched with the line. For example, as specified in lines 12, 15, and 17 through 24 of FIG. 12, entropy verification may be performed on a line matching a credential pattern for which a value of "entropy" is "true." Whether to perform the entropy verification on the line may be determined based on whether the credential pattern is simple or whether an identifier indicating a credential is included in the credential pattern. In other words, because a line matching a credential pattern despite not including an identifier generally has a high entropy value, there is little likelihood that the line corresponds to an FP even when the line is detected as a vulnerable line L2, i.e., a second line L2b, and thus, in this case, the scanning time may be shortened by skipping the entropy verification.

The second line detector 122 may filter out a line having a low entropy value from among extracted lines via entropy verification in operations 243 and 244 as described later. In general, because confidential information is composed of a combination of arbitrary character strings, the line has a relatively high entropy value. Even when the line includes the same pattern as the defined credential pattern, the line is highly unlikely to be a vulnerable line when the line or the pattern has a low entropy value. Therefore, by excluding, via the entropy verification, a line having a low entropy value despite including the same pattern as the defined credential pattern, an FP rate of the detected vulnerable lines L2 may be reduced.

In operation 243, the second line detector 122 may calculate a BASE64 entropy value for the extracted line or a portion of the extracted line matching the credential pattern to thereby determine whether the calculated BASE64 entropy value satisfies a certain condition, e.g., whether the BASE64 entropy is greater than n1. A line having a BASE64 entropy value greater than n1 may be detected as a second line L2b. n1 may be 3, but is not limited thereto. Because n1 is a number determined via simulation in order to filter out a non-vulnerable line in the process of detecting a second line L2b among the value assignment lines L1, n1 may be an appropriate value other than the above-mentioned value.

In operation 244, the second line detector 122 may calculate a HEX entropy value for a line having a BASE64 entropy value less than or equal to n1 or a portion matching the credential pattern in the line, and determine whether the calculated HEX entropy value satisfies a certain condition, e.g., whether the BASE64 entropy is greater than n2. A line having a HEX entropy value greater than n2 may be detected as a second line L2b. n2 may be 4.5, but is not limited thereto. Because n2 is a number determined via simulation in order to filter out a non-vulnerable line in the process of detecting a second line L2b among the value assignment lines L1, n2 may be an appropriate value other than the above-mentioned value.

According to an embodiment, because entropy verification is performed through operations 243 and 244, the efficiency of entropy verification may be improved.

In an embodiment, second lines L2b excluding non-vulnerable lines from the value assignment lines L1 may be detected by the second line detector 122. Accordingly, because lines that are highly unlikely to correspond to the vulnerable lines L2 are not detected as the second lines L2b, an FP rate of the detected vulnerable lines L2 may be reduced.

According to an embodiment of the present disclosure, vulnerabilities in the detected vulnerable lines L2 may be output as described with reference to FIG. 7.

Figure 7:
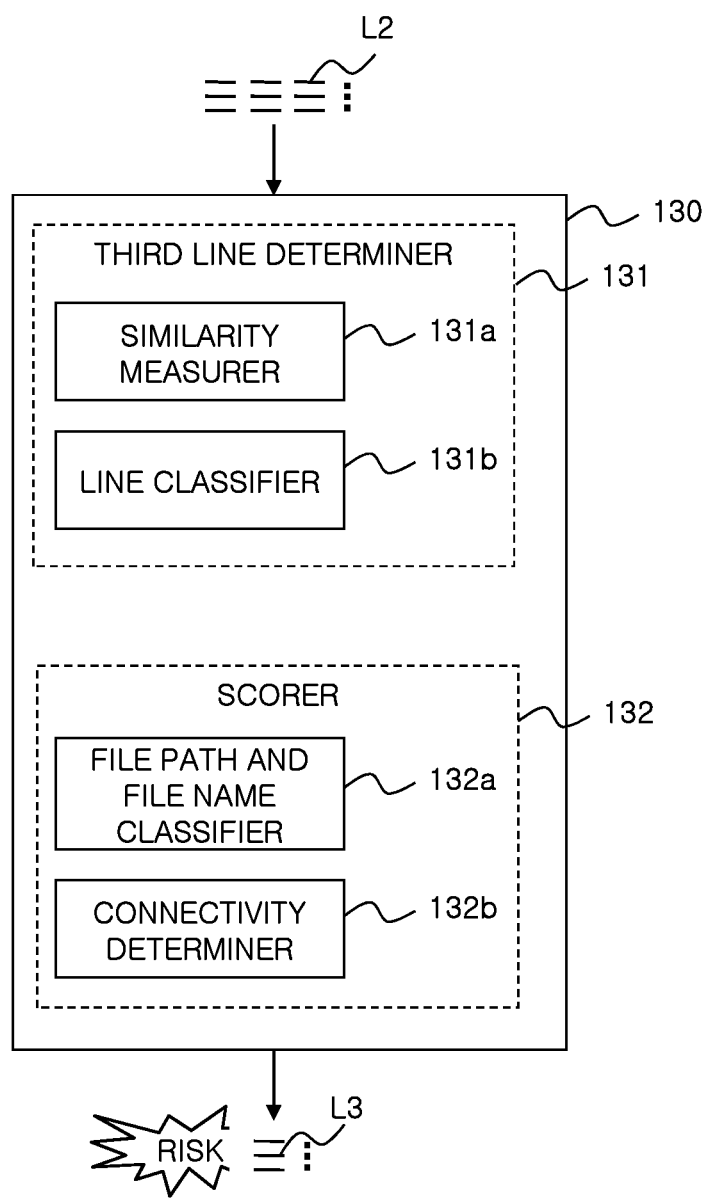
FIG. 7 illustrates a block diagram of a vulnerability outputter according to an embodiment of the present disclosure.

FIG. 7 of the present disclosure a block diagram of a vulnerability outputter according to an embodiment of the present disclosure.

Referring to FIG. 7, the vulnerability outputter 130 of the device 100 may include a third line determiner 131 and a scorer 132.

Vulnerabilities in the detected vulnerable lines L2 may be output via the vulnerability outputter 130 of the device 100. A vulnerability in a line indicates that the line includes or is determined to include confidential information.

The detected vulnerable lines L2 may include lines that are not actually related to confidential information. Thus, to remove an FP from detected vulnerable lines, the third line determiner 131 may determine third lines L3 from among the vulnerable lines L2 detected by the vulnerable line detector 120. For example, by filtering out repeatedly written lines from the source code via the third line determiner 131, non-vulnerable lines, i.e., lines determined to be irrelevant to confidential information or not to be exploited, may be excluded. By doing so, the rate of FPs out of detection results may be reduced, and the scanning time may be shortened.

Moreover, a vulnerability may indicate a degree of vulnerability, and the degree of vulnerability may be determined based on the importance of confidential information included in a corresponding line, whether a line similar to the corresponding line exists, the number of similar lines, etc. The scorer 132 may determine the degree of a vulnerability in a vulnerable line.

Figure 8:
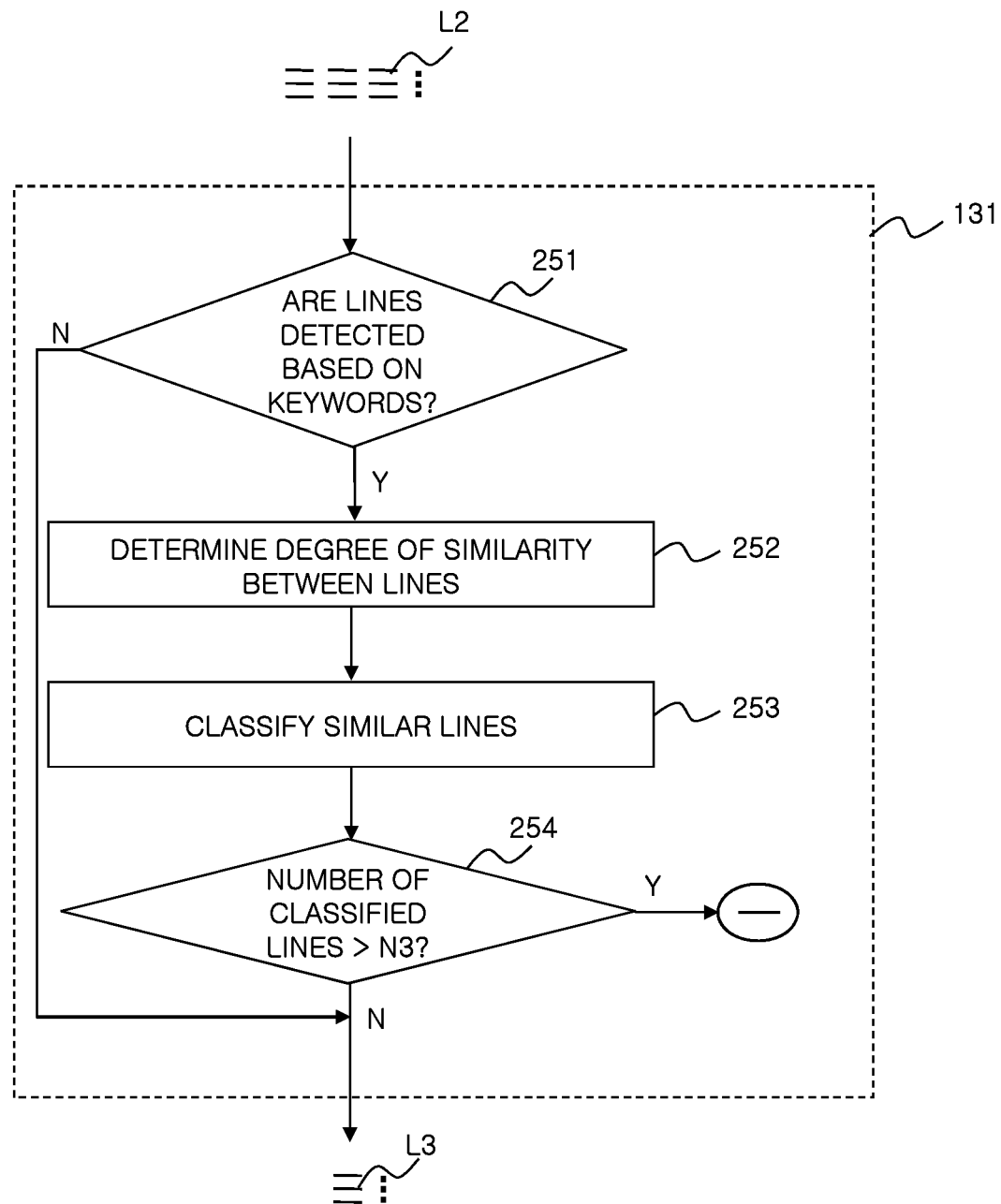
FIG. 8 illustrates a flowchart of a method of classifying lines based on a similarity, according to an embodiment of the present disclosure.

In an embodiment, the third line determiner 131 may include a similarity measurer 131*a* and a line classifier 131*b*, and a method, performed by the third line determiner 131, of determining third lines is described further with reference to FIG. 8.

FIG. 8 illustrates a flowchart of a method of classifying lines based on a degree of similarity according to an embodiment of the present disclosure.

In operation 251, the third line determiner 131 may identify lines detected based on keywords from among the detected vulnerable lines L2. In other words, the third line determiner 131 may identify the first lines L2a detected by the first line detector 121. Because a keyword is a word having a meaning while a pattern is a combination of arbitrary characters, the first lines L2a detected based on keywords may have a higher FP rate than the second lines L2b detected based on patterns. According to an embodiment, because only the degree of similarity between the first lines L2a is measured, scanning speed may be improved.

In operation 252, the third line determiner 131 may determine a degree of similarity between the lines. In other words, the third line determiner 131 may determine the degree of similarity between the first lines L2a detected based on the keywords. Because similar lines repeatedly written in the source code are highly likely to be irrelevant to confidential information, an FP rate may be reduced by filtering out similar lines from the first lines L2a detected based on the keywords.

In an embodiment, the degree of similarity between the first lines L2a determined based on the keywords may be determined by the similarity measurer 131*a*. Although a Levenshtein distance between lines may be measured to determine the degree of similarity between the lines, embodiments are not limited thereto, and other algorithms known to those skilled in the art may be used.

In operation 253, the third line determiner 131 may classify similar lines. In other words, the third line determiner 131 may classify similar lines among the detected vulnerable lines L2, and in particular, among the first lines L2a detected based on the keywords. For example, similar lines among the first lines L2a may be classified based on the Levenshtein distance between the first lines L2a.

In operation 254, the third line determiner 131 may determine whether the number of classified lines satisfies a certain condition, for example, whether the number is greater than n3. In an embodiment, except for (similar lines repeated in the source code a number of times greater than n3, a line different from other lines and similar lines repeated a number of times less than or equal to n3 may be determined to be the third lines L3. In other words, except for similar lines repeated a number of times greater than n3 among the first lines L2a, the third line determiner 131 may determine, to be the third lines L3, a line different from other lines and similar lines repeated a number of times less than or equal to n3. n3 may be 10, but is not limited thereto. Because n3 is a number determined via simulation in order to filter out a non-vulnerable line from the first lines L2a, n3 may be an appropriate value other than the above-mentioned value.

In an embodiment, the vulnerability outputter 130 may output vulnerabilities in specific lines of the source code. The vulnerability outputter 130 may output vulnerabilities indicating that the third lines L3 in the source code may be vulnerable. The vulnerability outputter 130 may output vulnerabilities indicating that the third lines L3 determined among the first lines L2a and the second lines L2b may be vulnerable.

In an embodiment, the third line determiner 131 may be included in the first line detector 121. When the third line determiner 131 is included in the first line detector 121, operation 251 may be omitted, and the third lines determined by the third line determiner 131 included in the first line detector 121 may be treated as vulnerable lines together with the second lines detected by the second line detector 12, and vulnerabilities in the second and third lines may be output.

Moreover, to determine a degree of vulnerability in a line, the scorer 132 may perform certain operations associated with the line. The scorer 132 may determine the degree of vulnerabilities in the third lines L3 determined by the third line determiner 131.

Figure 9:
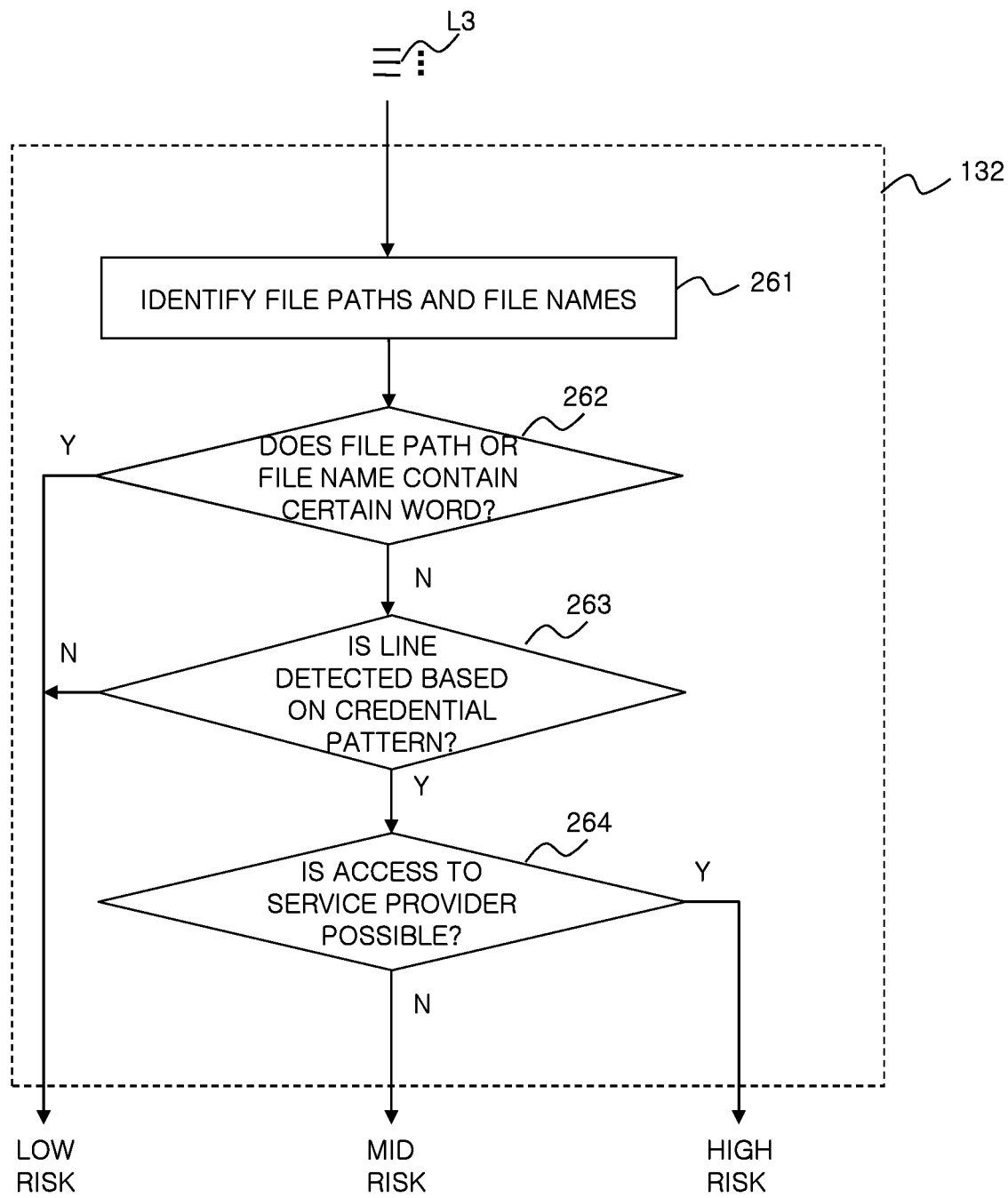
FIG. 9 illustrates a flowchart of a method of classifying a level of a vulnerability, according to an embodiment of the present disclosure.

In an embodiment, the scorer 132 may include a file path and file name classifier 132a and a connectivity determiner 132b, and a method, performed by the scorer 132, of determining a vulnerability in a vulnerable line is described further with reference to FIG. 9.

FIG. 9 illustrates a flowchart of a method of classifying a level of a vulnerability according to an embodiment of the present disclosure.

Source code may include details of a test or example of the application, and the importance of information included in lines related to the test or example in the source code may be relatively low. Therefore, when source code including a detected vulnerable line relates to a test or an example, the vulnerable line may be classified as low risk.

In operation 261, the scorer 132 may identify file paths and file names of files including lines. The scorer 132 may identify file paths and file names of files including the third lines L3 determined by the third line determiner 131. The scorer 132 may identify file paths and file names of files including the third lines L3 determined among the first lines L2a as well as the second lines L2b.

In operation 262, the scorer 132 may determine whether a file path or a file name of a file including a line contains a certain word. For example, the certain word may be a "test," an "example," etc., but is not limited thereto. When a file path or file name of a file contains a "test" or an "example," the file is highly likely to be related to a test or example of an application, so the line included in the file may be classified as low risk.

Moreover, the degree of a vulnerability in a line matching a credential pattern may be determined based on whether access to a service provider of the credential pattern is possible via the line. A line that provides connectivity to a service provider may be classified as high risk, and a line that does not provide connectivity thereto may be classified as medium risk.

In operation 263, the scorer 132 may identify whether the line is detected based on a credential pattern. The scorer 132 may identify whether a line not classified as low risk in operation 262, i.e., a line of a file that does not contain the certain word in its file path or file name, is a line detected based on a credential pattern. A line detected based on a keyword may be classified as low risk, while a line detected based on a credential pattern may be classified as medium risk or high risk.

In operation 264, the scorer 132 may determine a connectivity of the line to a service provider. When the line not classified as low risk in operation 262 is a line detected based on a credential pattern, i.e., one of the second lines L2b, the scorer 132 may determine whether access to the service provider of the credential pattern matching the line is possible via the line. By testing connectivity to the service provider only for lines detected based on credential patterns, scanning speed may be improved.

As a result of testing the connectivity to the service provider in operation 264, a line that provides a connectivity to the service provider may be classified as high risk while a line that does not provide a connectivity thereto may be classified as medium risk.

In an embodiment, the connectivity determiner 132b may be included in the second line detector 122. When the connectivity determiner 132b is included in the second line detector 122, operation 263 may be omitted, and operation 264 may be performed for the second lines L2b detected by the second line detector 122. After operation 264 is performed, file names and file paths of files including lines that do not provide connectivity to the service provider among the second lines L2b may be identified to output a vulnerability in a line containing a certain word in a corresponding file path or file name as having a low risk level and a vulnerability in a line that does not contain the certain word therein as having a medium risk level, and a vulnerability in a line that provides connectivity to the service provider may be output as having a high risk level.

Figure 10:
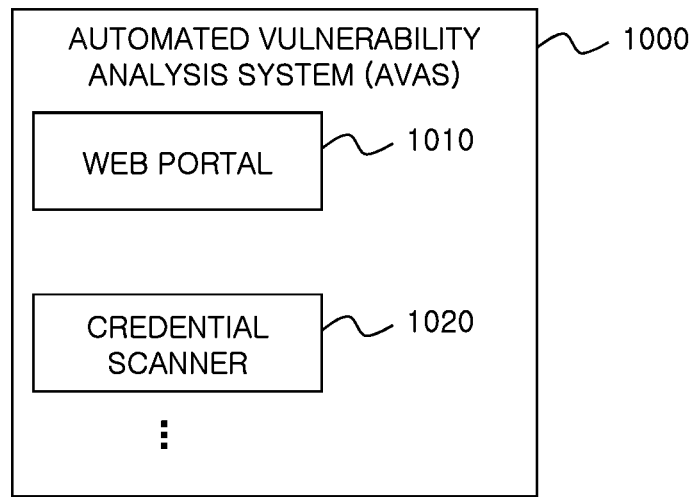
FIG. 10 illustrates a block diagram of an automated vulnerability analysis system (AVAS) according to an embodiment of the present disclosure.

FIG. 10 illustrates a block diagram of an automated vulnerability analysis system (AVAS) according to an embodiment of the present disclosure.

An AVAS 1000 may automatically analyze vulnerabilities that may exist in a software development environment. For example, the AVAS 1000 may analyze vulnerabilities that may be present in source code of software developed as open source software.

The AVAS 1000 may include a web portal 1010 and a credential scanner 1020. According to embodiments, the AVAS 1000 may include more or fewer units than the units described above. For example, the AVAS 1000 may further include various modules for analyzing vulnerabilities. According to an embodiment, the device 100 may be a part of the AVAS 1000.

The web portal 1010 and the credential scanner 1020 may be implemented as software, hardware, or a combination of software and hardware in order to provide corresponding services, but are not limited thereto.

The web portal 1010 may provide an interface that allows a user to use the AVAS 1000, and the credential scanner 1020 may scan the source code to determine whether the source code includes confidential information such as credentials. The credential scanner 1020 may detect a vulnerability in the source code by using the methods described above. According to an embodiment, a series of operations of the credential scanner 1020 may be performed by the device 100.

The source code may be uploaded directly to the credential scanner 1020 via the web portal 1010, or obtained from the credential scanner by using access information indicating a location of the source code or allowing access to the source code, such as a uniform resource locator (URL). The credential scanner 1020 may obtain the source code stored in a repository. The repository may be located outside the AVAS 1000.

In an embodiment, the AVAS 1000 may consist of a plurality of servers. The web portal 1010 and the credential scanner 1020 may be implemented as separate servers. The AVAS 1000 consisting of servers is described with reference to FIG. 11.

Figure 11:
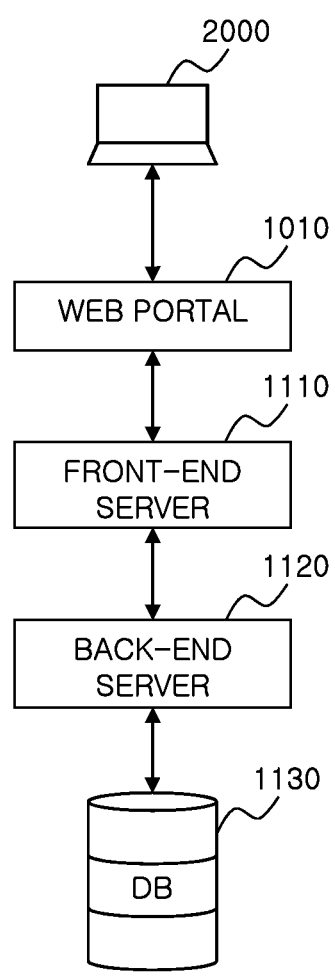
FIG. 11 illustrates a diagram for explaining an operation method of a server, according to an embodiment of the present disclosure.

FIG. 11 illustrates a diagram for explaining an operation method of a server according to an embodiment of the present disclosure.

The AVAS 1000 may include a web portal 1010, a front-end server 1110, a back-end server 1120, and a database (DB) 1130.

The user may send a request for execution of a service to the AVAS 1000 and receive a request processing result. A user's client device 2000 may request execution of the service from the front-end server 1110 via the web portal 1010, and thus, the user may request execution of the service from the AVAS 1000. Here, a request for detecting a vulnerability in source code may be transmitted to the front-end server 1110 via the web portal 1010.

Although the front-end server 1110 may directly call a program, process the request, and output a request processing result to the client device 2000 via the web portal 1010, the front-end server 1110 may instead transmit the request to the back-end server 1120 for processing by the back-end server 1120. The request processing result may be transmitted from the back-end server 1120 to the front-end server 1110 and output to the client device 2000 via the web portal 1010, and thus, the request processing result may be provided to the user by the AVAS 1000. The back-end server 1120 may access the DB 1130 to process requests or store information.

The front-end server 1110 may be referred to as a web server. The back-end server 1120 may be referred to as an application server or a web application server.

The credential scanner 1020 may be located in the back-end server 1120, but is not limited thereto.

In order to distribute load applied to a server by separating functions of a server and to enhance security, the front-end server 1110 and the back-end server 1120 may be implemented as separate servers that are physically separated, but are limited thereto. The front-end server 1110 and the back-end server 1120 may be physically implemented as a single server.

FIG. 12 illustrates an exemplary source code in a configuration file of a credential scanner according to an embodiment of the present disclosure.

Because the source code of FIG. 12 has been described with reference to the previous drawings, descriptions already provided above are omitted.

The credential scanner may detect vulnerable lines in the source code by referring to a configuration file. The credential scanner basically scans project files in a normal mode, but scanning efficiency may be improved by scanning specific files in a fast mode.

Embodiments may be described in terms of functional block components and various processing steps. Such functional blocks may be implemented by various numbers of hardware and/or software components configured to perform particular functions. For example, the embodiments may employ integrated circuit components, such as memories, processing elements, logic elements, look-up tables, etc., which may execute a variety of functions according to control by one or more microprocessors or other control devices. Similarly to where components are implemented using software programming or software elements, the embodiments may be implemented using a programming or scripting language such as C, C++, Java, assembler, etc., including the various algorithms implemented with any combination of data structures, processes, routines or other programming elements. Functional aspects may be implemented by algorithms that are executed in one or more processors. Furthermore, the embodiments may employ conventional techniques for electronic environment setting, signal processing and/or data processing. Terms such as 'mechanism', 'element', 'means', and 'configuration' may be used in a broad sense and are not limited to mechanical or physical components. The terms may include the meaning of a series of software routines in conjunction with processors, etc.

The embodiments are not intended to limit the scope of the present disclosure in any way. For the sake of brevity of the disclosure, conventional electronic configurations, control systems, software, and other functional aspects of the systems may be omitted. Furthermore, connection lines between elements or connection members shown in the figures represent exemplary functional connections and/or physical or circuit connections, and may be presented as various alternative or additional functional connections, physical connections, or circuit connections in an actual apparatus. In addition, an element may not be necessarily essential in the embodiments unless the element is specifically described as "essential," "crucial," etc.

The use of the term "the" and similar referents in the present disclosure, and in particular, in the following claims are to be construed to cover both the singular and the plural. Furthermore, in an embodiment where a range is described, recitation of the range should be understood as including the application of separate values falling within the range (unless there is a particular description contrary thereto) as if each separate value within the range were individually recited herein. Finally, operations of a method according to an embodiment may be performed in a suitable order unless otherwise specified herein or otherwise clearly contradicted by context. The embodiments are not necessarily limited by the order in which the operations are described. The use of any and all examples, or exemplary language (e.g., "such as," etc.) provided herein is intended to describe the embodiments in detail and does not pose a limitation on the scope of the present disclosure unless otherwise limited by the claims. It will also be understood by those skilled in the art that various changes, combinations, and modifications may be made therein according to design conditions and factors without departing from the accompanying claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of a device, the method comprising:
 identifying, based on a file extension or a file signature, source code;
 scanning the source code to determine whether the source code includes vulnerabilities, wherein the source code is uploaded to a scanner or obtained from the scanner using access information indicating a location of the source code;
 parsing, based on a file type, the source code using a different type of parser;

extracting, based on the parsed source code, value assignment lines from the source code, wherein the value assignment lines indicate lines where values are assigned in the source code;

detecting, based on keywords, first lines among the value assignment lines, wherein the keywords are obtained, by a keyword extractor based on a pre-configured formula;

detecting, based on credential patterns, second lines among the value assignment lines, wherein the second lines require an entropy verification determined based on the credential patterns;

determining third lines from the first lines including a number of lines that satisfies a condition determined based on a degree of similarity between lines in the first lines to reduce a false positivity, wherein the condition is determined based on confidential information of the source code associated with the vulnerabilities; and outputting the vulnerabilities in the second lines and the third lines included in the source code.

2. The method of claim 1, wherein the source code is obtained based on the access information received from a user via a web page.

3. The method of claim 1, further comprising obtaining project files, wherein the source code is included in a code file among the project files.

4. The method of claim 3, further comprising excluding a media file from the project files.

5. The method of claim 1, wherein the value assignment lines are extracted by tokenizing the source code into keys, separators, and values.

6. The method of claim 1, further comprising excluding a line associated with a second keyword and containing a word registered in a dictionary,
wherein:
the keywords include a first keyword and the second keyword; and
the first lines include a line associated with the first keyword.

7. The method of claim 1, further comprising excluding a line encrypted and associated with at least one of the keywords from the value assignment lines.

8. The method of claim 1, wherein each of the credential patterns is differently determined based on service providers.

9. The method of claim 1, further comprising excluding a line that satisfies an entropy condition for the entropy verification while matching with at least one of the credential patterns.

10. The method of claim 1, further comprising excluding lines that satisfies the condition among the first lines when the number of lines is greater than a number.

11. The method of claim 1, further comprising identifying file paths and file names of files including the second lines or the third lines,
wherein the vulnerabilities in the second lines and the third lines are output based on the file paths and the file names.

12. The method of claim 1, further comprising determining a connectivity to service providers based on the second lines,
wherein the vulnerabilities in the second lines are output based on the connectivity.

13. A device comprising:
a computer-readable medium storing instructions; and
a processor operably coupled to the computer-readable medium, the processor configured to:

identify, based on a file extension or a file signature, source code, scan the source code to determine whether the source code includes vulnerabilities, wherein the source code is uploaded to a scanner or obtained from the scanner using access information indicating a location of the source code, parse, based on a file type, the source code using a different type of parser, extract, based on the parsed source code, value assignment lines from the source code, wherein the value assignment lines indicate lines where values are assigned in the source code, detect, based on keywords, first lines based among the value assignment lines, wherein the keywords are obtained, by a keyword extractor based on a pre-configured formula, detect, based on credential patterns, second lines among the value assignment lines, wherein the second lines require an entropy verification determined based on the credential patterns, determine third lines from the first lines including a number of lines that satisfies a condition determined based on a degree of similarity between lines in the first lines to reduce a false positivity, wherein the condition is determined based on confidential information of the source code associated with the vulnerabilities, and output the vulnerabilities in the second lines and the third lines included in the source code.

14. The device of claim 13, wherein:
the source code is obtained based on the access information received from a user via a web page;
the value assignment lines are extracted by tokenizing the source code into keys, separators, and values; and
each of the credential patterns is differently determined based on service providers.

15. The device of claim 13, wherein:
the processor is further configured to:
obtain project files, the source code included in a code file among the project files,
exclude a media file from the project files, and
exclude a line associated with a second keyword and containing a word registered in a dictionary;
the keywords include a first keyword and the second keyword; and
the first lines include a line associated with the first keyword.

16. The device of claim 13, wherein:
the processor is further configured to:
exclude a line encrypted and associated with at least one of the keywords from the value assignment lines,
exclude a line that satisfies an entropy condition for the entropy verification while matching with at least one of the credential patterns,
exclude lines that satisfies the condition among the first lines when the number of lines is greater than a number,
identify file paths and file names of files including the second lines or the third lines, and
determine a connectivity to service providers based on the second lines, the vulnerabilities in the second lines outputting based on the connectivity; and
the vulnerabilities in the second lines and the third lines are output based on the file paths and the file names.

17. A computer-readable medium storing instructions which, when executed by a processor, cause the processor to:
- identify, based on a file extension or a file signature, source code;
- scan the source code to determine whether the source code includes vulnerabilities, wherein the source code is uploaded to a scanner or obtained from the scanner using access information indicating a location of the source code;
- parsing, based on a file type, the source code using a different type of parser
- extract, based on the parsed source code, value assignment lines from the source code, wherein the value assignment lines indicate lines where values are assigned in the source code;
- detect, based on keywords, first lines among the value assignment lines, wherein the keywords are obtained, by a keyword extractor based on a pre-configured formula;
- detect, based on credential patterns, second lines among the value assignment lines, wherein the second lines require an entropy verification determined based on the credential patterns;
- determine third lines from the first lines including a number of lines that satisfies a condition determined based on a degree of similarity between lines in the first lines to reduce a false positivity, wherein the condition is determined based on confidential information of the source code associated with the vulnerabilities; and
- output the vulnerabilities in the second lines and the third lines included in the source code.

18. The computer-readable medium of claim 17, wherein:
- the source code is obtained based on the access information received from a user via a web page;
- the value assignment lines are extracted by tokenizing the source code into keys, separators, and values; and
- each of the credential patterns is differently determined based on service providers.

19. The computer-readable medium of claim 17, when executed by a processor, cause the processor to:
- obtain project files, wherein the source code is included in a code file among the project files;
- exclude a media file from the project files;
- exclude a line associated with a second keyword and containing a certain word registered in a dictionary, wherein the keywords include a first keyword and the second keyword and the first lines include a line associated with the first keyword;
- exclude a line encrypted and associated with at least one of the keywords from the value assignment lines;
- exclude a line that satisfies an entropy condition for the entropy verification while matching with at least one of the credential patterns;
- exclude lines that satisfies the condition among the first lines when the number of lines is greater than a certain number;
- identify file paths and file names of files including the second lines or the third lines; and
- determine a connectivity to service providers based on the second lines, the vulnerabilities in the second lines outputting based on the connectivity, wherein the vulnerabilities in the second lines and the third lines are output based on the file paths and the file names.

* * * * *